(12) United States Patent
Stratton et al.

(10) Patent No.: US 11,841,503 B2
(45) Date of Patent: Dec. 12, 2023

(54) EFFICIENCY OF CATADIOPTRIC SYSTEM BY MEANS OF RECYCLING POLARIZED LIGHT

(71) Applicant: Rockwell Collins, Inc., Cedar Rapids, IA (US)

(72) Inventors: Eric P. Stratton, Portland, OR (US); Christopher A. Keith, Wilsonville, OR (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 345 days.

(21) Appl. No.: 17/180,363

(22) Filed: Feb. 19, 2021

(65) Prior Publication Data

US 2022/0269072 A1 Aug. 25, 2022

(51) Int. Cl.
*G02B 27/01* (2006.01)
*G02B 27/30* (2006.01)
*G02B 27/28* (2006.01)
*G02B 5/30* (2006.01)
*G02B 17/08* (2006.01)

(52) U.S. Cl.
CPC ....... *G02B 27/0101* (2013.01); *G02B 5/3083* (2013.01); *G02B 17/08* (2013.01); *G02B 27/283* (2013.01); *G02B 27/30* (2013.01)

(58) Field of Classification Search
CPC .. G02B 27/0101; G02B 5/3083; G02B 17/08; G02B 27/283; G02B 27/30
USPC ........................................................ 359/485
See application file for complete search history.

(56) References Cited

U.S. PATENT DOCUMENTS

| 3,677,621 A | 7/1972 | Smith |
| 9,523,852 B1 | 12/2016 | Brown et al. |
| 10,746,989 B2 | 8/2020 | Brown et al. |
| 2018/0275396 A1 | 9/2018 | Schowengerdt et al. |

FOREIGN PATENT DOCUMENTS

| EP | 3839608 A1 | 6/2021 |
| TW | 201331629 A | 8/2013 |
| TW | I710805 B | 11/2020 |
| WO | 2013062932 A1 | 5/2013 |
| WO | 2020174433 A2 | 9/2020 |

OTHER PUBLICATIONS

Extended Search Report in European Application No. 22156747.2 dated Jul. 7, 2022, 8 pages.

*Primary Examiner* — Joseph P Martinez
*Assistant Examiner* — Grant A Gagnon
(74) *Attorney, Agent, or Firm* — Suiter Swantz pc llo (57) ABSTRACT

An optical system is disclosed. The optical system includes collimating optics, including a polarization beam splitter, which includes one or more polarizations selection reflection surfaces configured to split image light into (s)-polarized light and (p)-polarized light. The collimating optics further include a first mirror configured to receive and reflect (p)-polarized light emitted from the one or more polarization selective reflection surfaces, a second mirror configured to receive and reflect (s)-polarized light emitted from the one or more polarization selective reflection surface, and a corrector lens configured to receive (p)-polarized light reflected from the first mirror and receive (s)-polarized light reflected from the second mirror, wherein a light path of the (s)-polarized light and a light path of the (p)-polarized light are substantially equal, wherein the (p)-polarized light and the (s)-polarized light are configured to combine to form a user image.

14 Claims, 5 Drawing Sheets

EFFICIENCY OF CATADIOPTRIC SYSTEM BY MEANS OF RECYCLING POLARIZED LIGHT

BACKGROUND

Catadioptric optical systems combine reflection and refraction optics. These systems are found in a variety of displays, including head up displays (HUDs) such as fixed HUDs and worn displays (e.g., head worn displays, helmet mounted displays, virtual glasses, etc.). A common component found in these systems is a polarizing beam splitter (PBS).

A PBS works by reflecting light of one polarization type in a reflected direction, typically 90 degrees, and transmitting light of the orthogonal polarization in a transmitted direction with no change in angle. The catadioptric system utilizing a PBS requires polarized light incident on the system, which reduces throughput efficiency for the entire optical path. For example, by polarizing an optical system, light utilization efficiency is reduced to ~45% in addition to other optical losses. Accordingly, it is desirable to provide a PBS-based optical system that provides adequate display characteristics while utilizing light with greater efficiency than conventional approaches

SUMMARY

An optical system is disclosed. In one or more embodiments, the optical system includes collimating optics. In one or more embodiments, collimating optics includes a polarization beam splitter. In one or more embodiments, the polarization beam splitter includes one or more polarization selection reflection surfaces. In one or more embodiments, the one or more polarization selection reflection surfaces configured to split image light from a light source into a first light beam and a second light beam. In one or more embodiments, the collimating optics includes a first waveplate configured to receive the first light beam. In one or more embodiments, the collimating optics includes a first mirror configured to receive the first light beam from the first waveplate and reflect the first light beam back through the first waveplate, wherein the first light beam transmits through or reflects from one of the one or more polarization selection reflection surfaces, wherein the first light beam that transmits through or reflects from the one of the one or more polarization selection reflection surfaces is configured as (s)-polarization light. In one or more embodiments, the collimating optics includes a second waveplate configured to receive the second light beam. In one or more embodiments, the collimating optics include a second mirror configured to receive the second light beam from the second waveplate and reflect the second light beam back through the second waveplate, wherein the second light beam transmits through or reflects from the one of the one or more polarization selection reflection surfaces, wherein the second light beam that transmits through or reflects from the one or more polarization selection reflection surfaces is configured as (p)-polarization light. In one or more embodiments, the collimating optics includes a corrector lens configured to receive the first light beam reflected from the first mirror and the second light beam reflected from the second mirror, wherein a length of a light path of the first light beam and a length of a light path of the second light beam are substantially equal, wherein the first light beam and second light beam are configured to combine to form a user image.

In some embodiments of the optical system, the light path of the first light beam and the light path of the second light beam are parallel when exiting the collimating optics.

In some embodiments of the optical system, the light path of the first light beam and the light path of the second light beam are collinear when exiting the collimating optics In some embodiments of the optical system, the optical system further includes a field lens disposed on the polarization beam splitter configured to receive the image light from the light source.

In some embodiments of the optical system, the corrector lens, the field lens, the first mirror, the second mirror, and the polarization beam splitter are configured to fit into a package with a volume less than two cubic centimeters.

In some embodiments of the optical system, the optical system further includes the light source.

In some embodiments of the optical system, the light source includes at least one of a light emitting diode display, a micro light emitting diode display, an organic light emitting diode display, an active-matrix liquid crystal display, or a liquid crystal on silicon display or a digital micromirror device display.

In some embodiments of the optical system, the optical system is configured as a collimating system for display on a substrate waveguide.

In some embodiments of the optical system, the substrate waveguide is to be configured as a head up display.

In some embodiments of the optical system, the light source includes at least one of a source beam splitter, a mirror, or a prism.

In some embodiments of the optical system, the optical system further comprises a color-sensitive beam splitter.

In some embodiments of the optical system, field lens comprises a diffractive surface.

In some embodiments of the optical system, one of the one or more polarization selective reflective surfaces comprises a quarter wave retarder film.

In some embodiments of the optical system, at least one of the first waveplate or the second waveplate includes a quarter wave retarder film.

In some embodiments of the optical system, the light path of the first light beam and the light path of the second light beam are within 1 mm of each other when exiting the collimating optics.

In some embodiments of the optical system, the light path of the first light beam and the light path of the second light beam are parallel when exiting the collimating optics.

A method for providing light information to a user is also disclosed. In one or more embodiments, the method for providing light information to a user includes transmitting image light from a light source to a polarizing beam splitter. In one or more embodiments, the method for providing light information to a user includes splitting the image light into a first light beam and a second light beam, wherein the first light beam and a second light beam are linearly polarized. In one or more embodiments, the method for providing light information to a user includes transmitting the first light beam through a first waveplate, wherein the first light beam becomes circularly polarized. In one or more embodiments, the method for providing light information to a user includes reflecting the first light beam off of a first mirror, wherein the first light beam is converted to circularly polarized light of a different handedness. In one or more embodiments, the method for providing light information to a user includes transmitting the second light beam through a second waveplate, wherein the second light beam becomes circularly polarized. In one or more embodiments, the method for providing light information to a user includes reflecting the second light beam off of a second mirror, wherein the second light beam is converted to circularly polarized light of a different handedness. In one or more embodiments, the method for providing light information to a user includes transmitting the first light beam back through the first waveplate and through a polarization selection reflection surface, wherein light from the first light beam transmitting though the polarized selection reflection surface is configured as (p)-polarized light. In one or more embodiments, the method for providing light information to a user includes transmitting the second light beam back through the second waveplate and reflecting the second light beam off of the polarization selection reflection surface, wherein the light from the second light beam reflected off of the polarization selection reflection surface is configured as (s)-polarized light. In one or more embodiments, the method for providing light information to a user includes directing the first light beam and second light beam to a corrector lens, wherein the first light beam and the second light beam are combined to form a user image.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

A collimating catadioptric optical system is disclosed. The optical system includes a polarizing beam splitter, two waveplates, and two mirrors. The optical system is configured to receive incoming unpolarized light and split the unpolarized light into a linear polarized first light beam and a linear polarized second light beam. The first light beam transmits through a first waveplate to a first mirror, which reflects the first light beam back through the first waveplate, resulting in a (s)-polarized light. The second light beam transmits through a second waveplate to a second mirror, which reflects the second light beam back through the second waveplate, resulting in a (p)-polarized light. The (s)-polarized light and the (p)-polarized light are directed via the polarizing beam splitter into a parallel and collimated pair of light beams. Specifically, the polarization sensitive coating on the polarizing beam splitter selectively reflects (s)-polarized light, and transmits (p)-polarized light. In this matter, the light from the (p)-polarized light is not lost but reflected back into the system. The system may further include one or more lenses and other componentry for directing, collimating, and/or modifying the light. Catadioptric collimator systems are used in a variety of optical systems. U.S. Pat. No. 10,746,989 issued to Brown discloses a catadioptric collimator for head up displays (HUD), which is incorporated by reference in their entirety.

Figure 1:
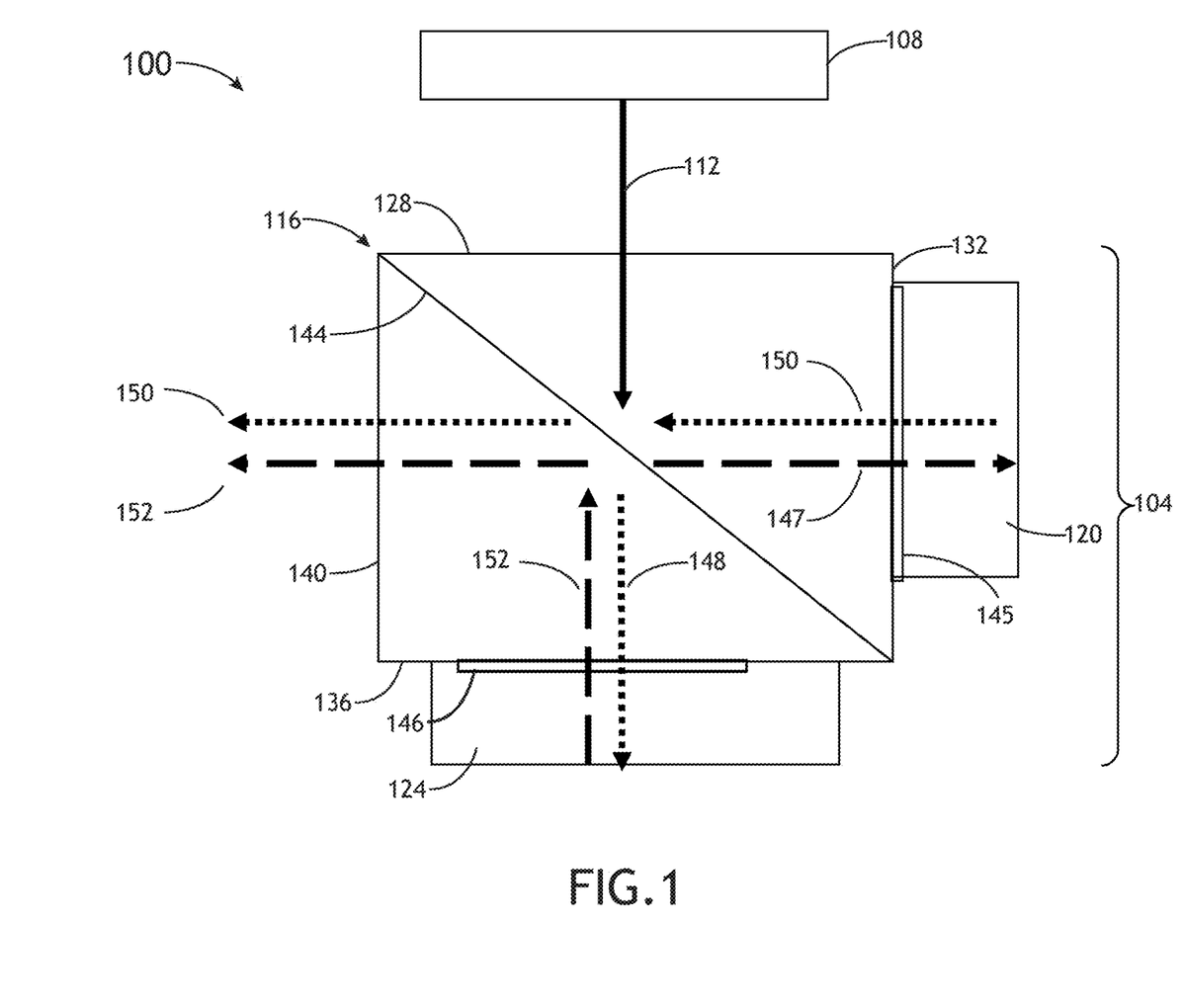
FIG. 1 is a block diagram illustrating an optical system, in accordance with one or more embodiments of this disclosure.

FIG. 1 is a block diagram illustrating an optical system 100, in accordance with one or more embodiments of this disclosure. In embodiments, the optical system 100 may be configured as a collimating system configured with collimating optics 104 that an image for display on a substrate waveguide, such as an HUD. The term HUD as used herein refers to a fixed HUD, a near eye display, a head worn display, a helmet mounted display or any type of display using a combiner for overlaying images from a light source over a real-world scene. The HUD system may be configured for use in smaller cockpit environments and in worn display applications and yet provides an appropriate field of view and eye box for avionic applications in some embodiments. The HUD system may be configured for use with worn components, such as, glasses, goggles, hats, helmets, etc. or be a HUD system with a fixed combiner in some embodiments. The substrate waveguide may be configured as a reflective combiner or holographic combiner. The collimating optics 104 are integrated or spaced apart from the substrate waveguide and/or other components of the optical system 100. In some embodiments, the combiner may be configured as a waveguide combiner designed to combine light from two or more inputs into a single output.

In embodiments, the optical system 100 includes a light source 108 configured to emit image light 112 (e.g., light from the light source intended to form an observable image to a user) to the collimating optics 104. The light source 108 can be any device for providing an image including but not limited to a digital micromirror device (DMD) display, a CRT display, a light emitting diode (LED) display, a micro LED display, an organic light emitting diode (OLED) display, an active-matrix liquid crystal display (AMLCD), a liquid crystal on silicon (LCOS) display, etc. In some embodiments, the light source 108 is a micro display and provides linearly polarized light.

In some embodiments, the collimating optics 104 are configured as a catadioptric collimator system and include a polarizing beam splitter 116, a first mirror 120, and a second mirror 124. The first mirror 120 and/or second mirror may be configured as a having a curved surface. In some embodiments, the polarizing beam splitter 116 is configured as a rectangular prism form. The polarizing beam splitter 116 includes a front face 128, a first waveplate face 132, a second waveplate face 136, an end face 140, and one or more polarization selective reflective surfaces 144 in some embodiments. The polarization selective reflective surface may be configured as a dielectric coating, a wire-grid polarizer surface, or any other surface configured to selectively reflect polarized light. The first mirror is disposes on first waveplate face 132 and the second mirror is disposed on face 136. The polarizing beam splitter 116 provides an internal folded optical path (e.g., the polarizing beam splitter 116 operating as a fold mirror).

In some embodiments, the collimating optics include a first waveplate 145 disposed adjacent to or upon the first waveplate face 132 and a second waveplate 146 disposed adjacent to or upon the second waveplate face 136. The first waveplate 145 and second waveplate may be configured as any polarizing material capable of altering the polarization state of a light wave traveling through it. For example, the first waveplate 145 and/or second waveplate 146 may be configured as a half-wave plate, a half-wave retarder film, quarter-wave plate, or a quarter wave retarder film. For instance, the first waveplate 145 and/or second waveplate 146 may be configured as a quarter-wave plate that converts linearly polarized light into circular polarized light. The first waveplate 145 and/or second waveplate 146 may be constructed of any material including but not limited to quartz, mica, or plastic.

Image light 112 transmits through the face 128 of the polarizing beam splitter 116 from the light source 108 is partially reflected off of the one or more polarization selective reflective surfaces 144 within the polarizing beam splitter 116, producing a first light beam 147 that is linear polarized. The first light beam 147 transmits through the first waveplate 145, altering the linearly polarized light of the first light beam 147 to circularly polarized light. The first light beam 147 then reflects off of the first mirror, reversing the handedness of the circular polarized first light beam 147, and the first light beam 147 passes back through the first waveplate 145, becoming (p)-polarized light 150. The (p)-polarized light 150 then transmits through the one or more polarization selective reflective surfaces 144 and through the end face 140.

The splitting of the image light 112 by the polarizing beam splitter also produces a second light beam 148 that is linear polarized. The second light beam 148 transmits through the one or more polarization selective reflective surfaces 144 and transmits through the second waveplate 146, altering the linearly polarized light of the first light beam 147 to circularly polarized light. The second light beam 148 then reflects off of the second mirror 124, reversing the handedness of the circular polarized second light beam 148, and the second light beam 148 passes back through the second waveplate 146 becoming (s)-polarized light 152. The (s)-polarized light 152 then reflects off of the one or more polarization reflective surfaces 144 and transmits through the end face 140.

The combination of elements in the collimating optics 104 collimates light at an exit pupil associated with the end face 140. The collimating optics 104 embodied as a catadioptric system advantageously assists in making the design of the system substantially smaller in volume than conventional designs in one embodiment. For example, the collimating optics in some embodiments has a volume of less than 20 cubic centimeters. However, the collimating optics 104 may be of any size or size range. For example, the collimating optics may have a volume ranging from 20 cubic centimeters to 200 cubic centimeters. In another example, the collimating optics may have a volume greater than 200 cubic centimeters. In another example, the collimating optics may have a volume smaller than 2.0 cubic centimeters. In another example, the collimating optics may have a volume smaller than 0.2 cubic centimeters. In another example, the collimating optics may have a volume smaller than 0.02 cubic centimeters.

Importantly, the use (e.g., recycling) of (p)-polarized light 148 in the collimating optics 104 greatly increases the efficiency that image light 112 from the light source 108 reaches the end face 140 and/or a user (e.g., in the form of (s)-polarized light 152 and (p)-polarized light 150) as nearly twice the available light reaches the end face 140 as would have in conventional collimating optics that utilize only (s)-polarized light 152. For example, a user may receive 40% more light energy from the optical system 100 than from a system that does not include a second mirror 124, using identical light sources 108. In another example, a user may receive 45% more light energy from the optical system 100 than from a system that does not include a second mirror 124, using identical light sources. Correspondingly, removal of the second mirror from the system 100 may reduce light energy transmitted by the system by over 40 percent. No noticeable change in image quality is detected, as the light path of the first light beam 147 and the second light beam 148 are substantially equivalent.

Figure 2:
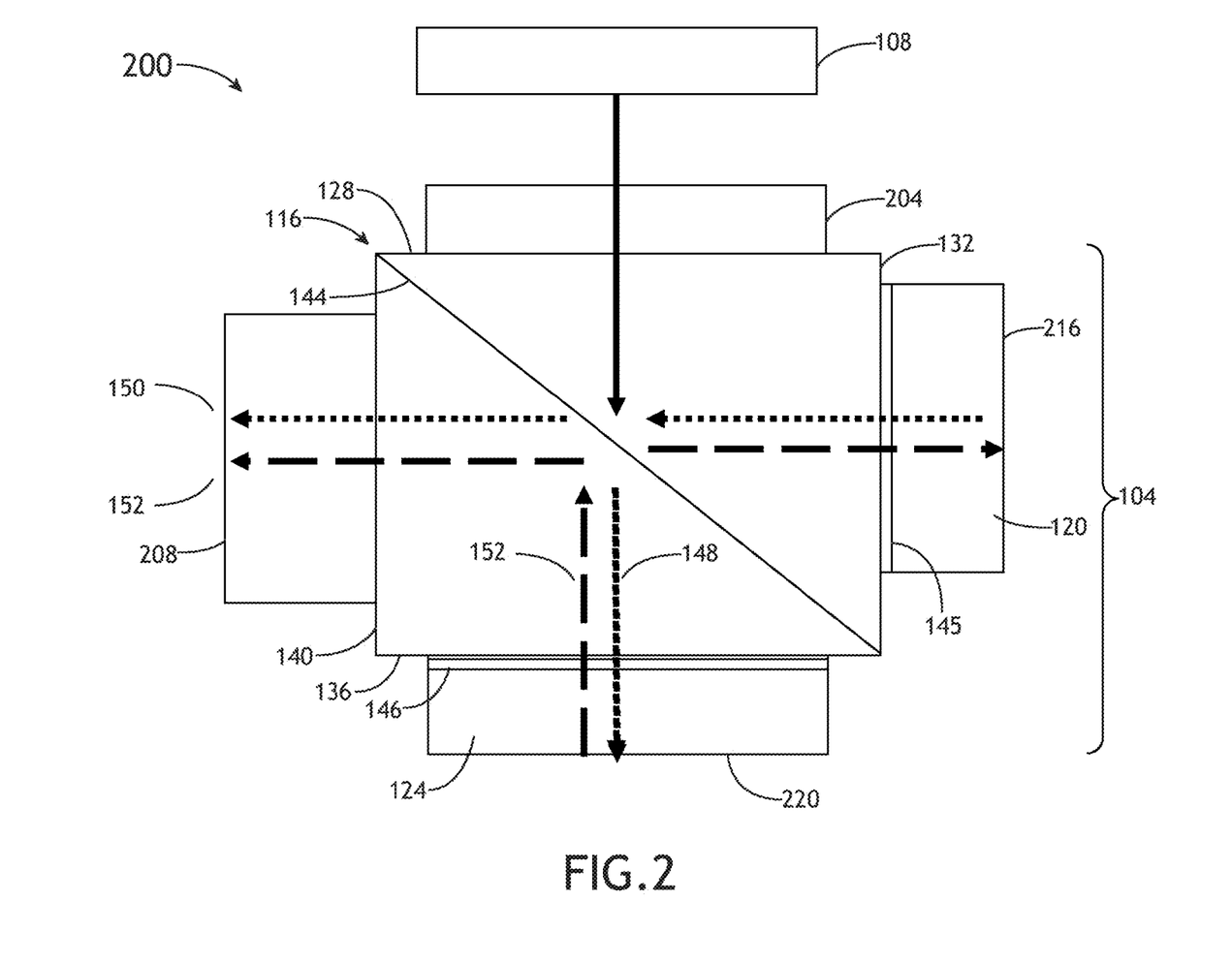
FIG. 2 is a block diagram illustrating an optical system, in accordance with one or more embodiments of this disclosure.

FIG. 2 is a block diagram illustrating an optical system 200, in accordance with one or more embodiments of this disclosure. The optical system 200 is configured with one or more components as the optical system 100. For example, the optical system 200 may be configured with all of the components of optical system 100. In some embodiments, the collimating optics 104 further includes a field lens 204 disposed on face 128 configured to receive light from the light source 108, a corrector lens 208 configured to receive (s)-polarized light 150 and (p)-polarized light 152 from the polarizing beam splitter 116, In some embodiments, the field lens 204 includes a diffractive surface and/or is configured as a plano-convex aspherical lens. For example, the diffractive surface may be configured as an aspheric surface processed by diamond grinding, etching, lithography, molding or other process to form diffractive grooves. The diffractive surface provides color correction and higher order aberration control for the collimating optics 104 in some embodiments. The field lens 204 is manufactured from optical glass or plastic material in some embodiments. In some embodiments, a retarder plate or retarder film can be provided before or after the field lens 204 to effect a polarization change. In some embodiments, the corrector lens 208 is manufactured from optical glass or plastic material.

In some embodiments, the first mirror 120 includes a curved reflective surface 216. For example, the first mirror 120 may be configured with a curved reflective surface 216 having a dichroic surface, a silvered reflecting surface, a metallic reflecting surface, or any other reflecting surface. The first mirror 120 may be curved to assist the collimation of light through the collimating optics 104. In some embodiments, the first mirror 120 provides an aspheric medium for the curved reflective surface 216 and is manufactured from optical glass or plastic material in some embodiments.

In some embodiments, the second mirror 124 includes a second reflective surface 220. For example, the second mirror 124 may be configured with a second reflective surface 220 having a dichroic surface, a silvered reflecting surface, a metallic reflecting surface, or any other reflecting surface. The second mirror 124 may be curved to assist the collimation of light through the collimating optics 104. In some embodiments, the second mirror 124 provides an aspheric medium for the second reflective surface 220 and is manufactured from optical glass or plastic material in some embodiments. The combination of the field lens 204, the first mirror 120, the second mirror 124. the polarizing beam splitter 116 and the corrector lens 106 serve to collimate light in some embodiments.

The elements of the collimating optics 104 can be cemented together around polarizing beam splitter 116 to form a small, compact package. Mounting the field lens 204, the first mirror 120 and/or the second mirror 124 directly to the polarizing beam splitter 116 or film provided on the polarizing beam splitter 116 provides mechanical alignment in very tight tolerances. Advantageously, the corrector lens 208 can have dimensions identical to dimensions associated with the face 140 of the polarizing beam splitter 116 such that easy alignment is obtained. Similarly, the field lens 204, the first mirror 120 and/or the second mirror 124 can match the sizes of the respective faces 128, 124 and 136.

Figure 3:
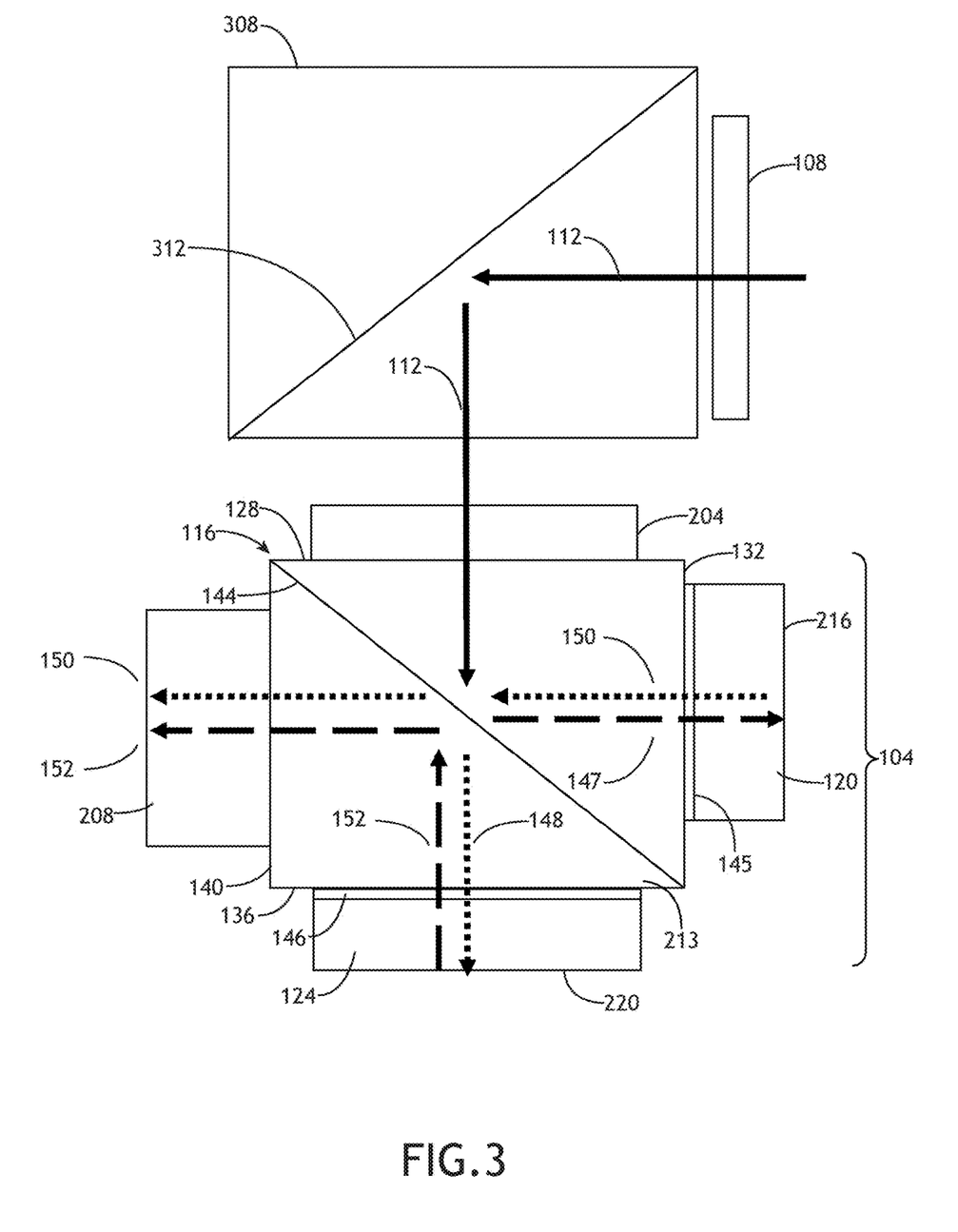
FIG. 3 is a block diagram illustrating an optical system, in accordance with one or more embodiments of this disclosure.

FIG. 3 is a block diagram illustrating an optical system 300, in accordance with one or more embodiments of this disclosure. The optical system 300 is configured with one or more components as the optical system 100, 200. For example, the optical system 300 may be configured with all of the components of optical system 100. In some embodiments, the optical system 300, includes the light source 108 and a light source beam splitter 308 configured with or without a source sensitive reflective coating 312. For example, the light source 108 configured as a DMD micro display, wherein an image (e.g., image light 112) transmitted from the DMD micro display is reflected by the source reflective coating 312 to the collimating optics 104. The collimating optics 104 include the field lens 204, the polarizing beam splitter 116, the first waveplate 145, the first mirror 120, the second waveplate 146, the second mirror 124 and the correcting lens 208. In some embodiments, the optical system 300 may include a light source retarder disposed between the light source 108 and the light source beam splitter 308. For instance, the light source retarder may be used with LCOS displays.

As in optical system 100, 200, optical system 300 creates (s)-polarized light 150 and (p)-polarized light 152. For example, after the image light 112 is split into a first light beam 147 and a second light beam 148 and, the light waves are transformed into (p)- polarized light 150 and (s)-polarized light 152 via sequential transmittance through their respective waveplates (e.g., the first waveplate 145 and second waveplate 146), with both the (p)-polarized light 150 and the (s)-polarized light 152 exiting as a collimated and parallel light sources via the correcting lens 208.

Figure 4:
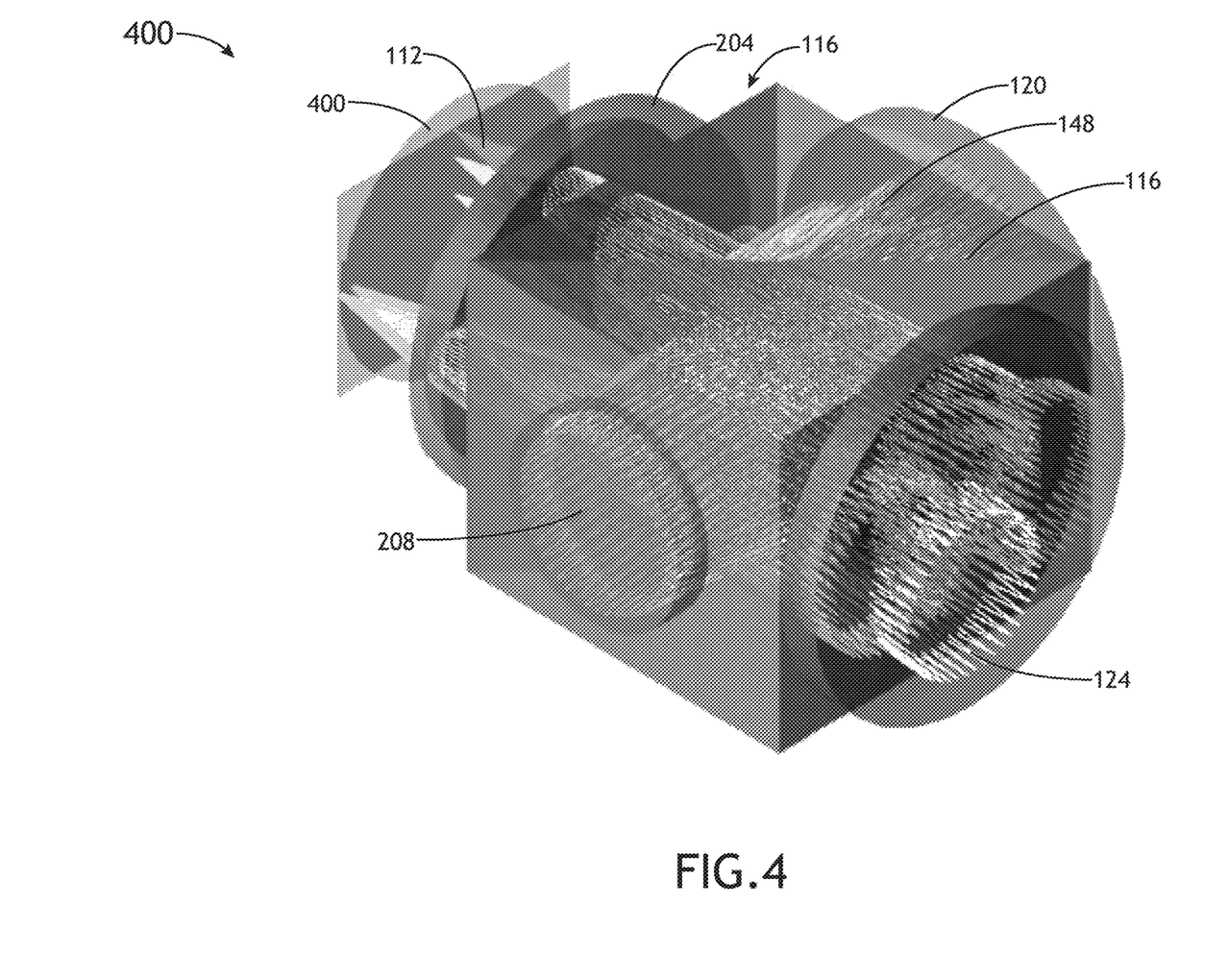
FIG. 4 illustrates a perspective view of an optical system, in accordance with one or more embodiments of this disclosure.

FIG. 4 illustrates a perspective view of an optical system 400, in accordance with one or more embodiments of this disclosure. The optical system 400 is configured with one or more components as the optical system 100, 200, 300. For example, the optical system 300 may be configured with all of the components of optical system 100. In embodiments, the optical system includes a light source 108 projecting image light (e.g., the green light in FIG. 4). The image light passes through the field lens 204 through the polarizing beam splitter 116, which splits the image light into a first light beam 147 and a second light beam 148. The first light beam 147 is transmitted through the first waveplate 145 toward the first mirror 120, which is reflected back through the first waveplate, converting the first light beam from linearly polarized light to (p)-polarized light. The (p)-polarized light 150 is then transmits through the one or more polarization selective reflective surfaces 144, out of the polarizing beam splitter 116 and through the correcting lens 208. The second light beam 148 is directed to and transmits through the second waveplate 146 to the second mirror 124, which is reflected, and the second light beam is again transmitted through the second waveplate, converting the second light beam from linearly polarized light to (s)-polarized light 152. The (s)-polarized light 152 is then reflected back to the one or the one or more polarization selective reflective surfaces 144, where the (p)-polarized light 152 is reflected out of the polarizing beam splitter 116 and through the correcting lens 208. The (p)-polarized light 150 and (s)-polarized light 152 exiting the correcting lens are collimated.

The optical systems 100, 200, 300, 400 may be configured to be of any size of shape. For example, the optical systems 100, 200, 300, 400, may fit into a package with a volume less than 1 cubic centimeter. For instance, an optical system 100, 200, 300, 400 containing the corrector lens 208, the field lens 204, the first mirror 120, the second mirror 124, and the polarization beam splitter 116 may fit into a package with a volume less than two cubic centimeters.

In some embodiments, the system 100, 200, 300, 400 may include a color-selective beam splitter. For example, the polarizing beam splitter 116 may be configured as a color-selective beam splitter. In another example, the light source beam splitter 308 may be configured as a color-selective beam splitter. In another example, the system 100, 200, 300, 400 may comprise a beam splitter in addition to the light source beam splitter 308 and/or the polarizing beam splitter 116 configured as a color sensitive beam splitter. It should be noted that a color sensitive polarizing beam splitter or fold mirror does not require optical paths into and out of the color sensitive polarizing beam splitter or fold mirror to be orthogonal. Rather, the angle of incidence needs to be different for the beam splitting path as compared to the recombining path. Therefore, the above description should not be interpreted as a limitation of the present disclosure, but merely as an illustration.

Figure 5:
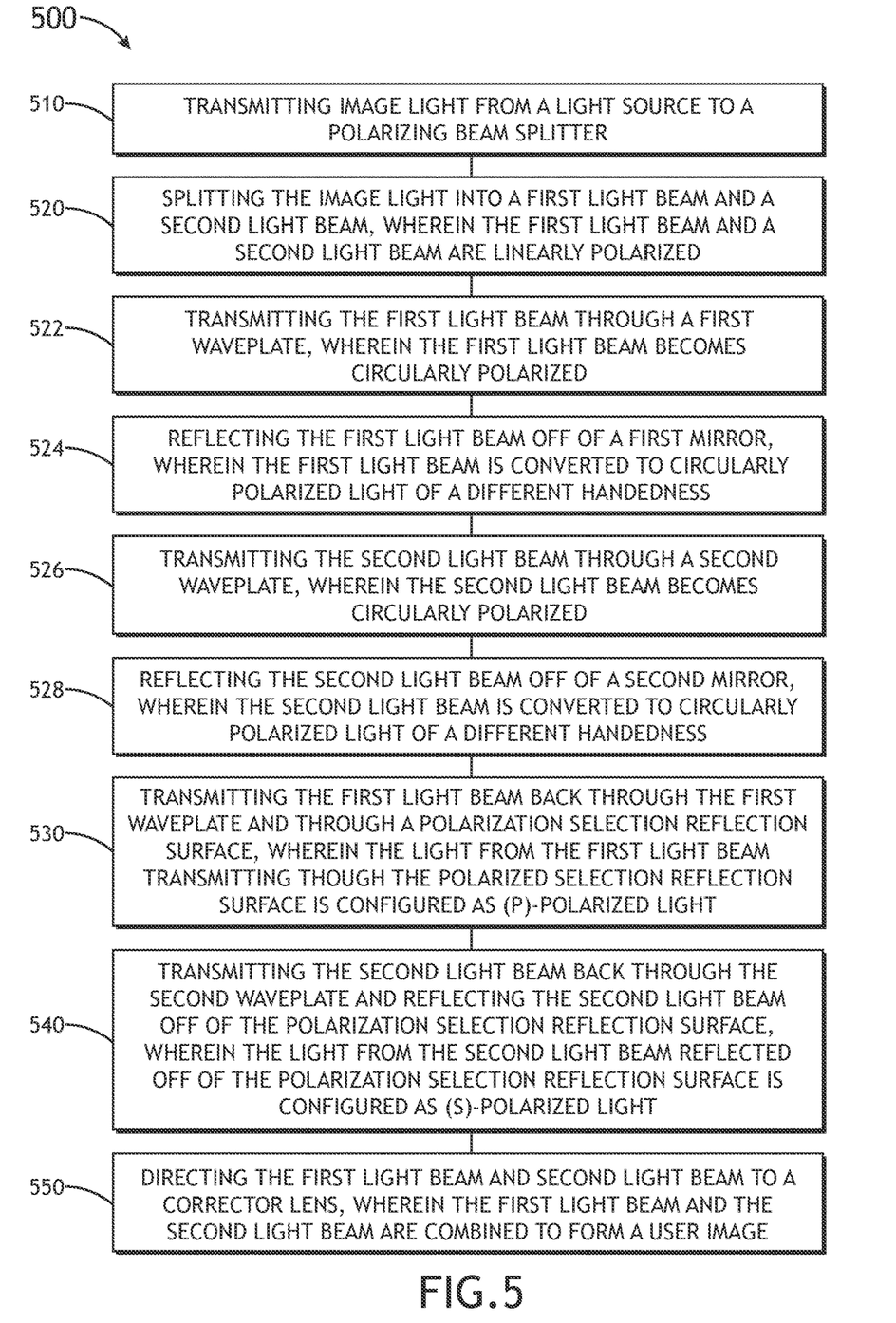
FIG. 5 is a flow diagram illustrating a method for providing light information to a user, in accordance with one or more embodiments of this disclosure.

FIG. 5 is a flow diagram illustrating a method 500 for providing light information to a user, in accordance with one or more embodiments of this disclosure. In embodiments, the method 500 includes a step 510 of transmitting image light 112 from a light source 108 to a polarizing beam splitter 116. The light source 108 may be configured as any light source including but not limited to a DMD micro display. The beam of the image light may also pass through a field lens 204).

In embodiments, the method 500 includes a step 520 of splitting the image light 112 into a first light beam 147 and a second light beam 148, wherein the first light beam 147 and a second light beam 148 are linearly polarized. For example, image light 112 may be split by the polarization selection reflection surface 144 of the polarizing beam splitter 116 into a linear polarized first light beam 147 (e.g., a (s)-polarized first light beam) and a linear polarized second light beam 148 (e.g., a (p)-polarized second light beam).

In embodiments, the method 500 includes a step 522 of transmitting the first light beam 147 through a first waveplate 145, wherein the first light beam 147 becomes circularly polarized. For example, When the electric field vector of the input, or incident, linear polarized first tight beam 147 is oriented at a 45° angle to the slow and fast axes of the first waveplate 145 (e.g., a quarter waveplate), the output light of the first light beam 147 becomes circularly polarized.

In embodiments, the method 500 includes a step 524 of reflecting the first light beam 147 off of a first mirror 120, wherein the first light beam 147 is converted to circularly polarized light of a different handedness. For example, the first mirror 120 may convert left-hand circular polarized light of the first light beam 147 to right-hand circular polarized light. In another example, the first mirror 120 may convert right-hand circular polarized light of the first light beam 147 to left-hand circular polarized light.

In embodiments, the method 500 includes a step 526 of transmitting the second light beam 148 through a second waveplate 145, wherein the second light beam 148 becomes circularly polarized. For example, When the electric field vector of the input, or incident, linear polarized second tight beam 148 is oriented at a 45° angle to the slow and fast axes of the second waveplate 146 (e.g., a quarter waveplate), the output light of the second beam 148 becomes circularly polarized.

In embodiments, the method 500 includes a step 528 of reflecting the second light beam 148 off of a second mirror 124, wherein the second light beam 148 is converter to circular polarized light of a different handedness. For example, the second mirror 124 may convert left-hand circular polarized light of the second light beam 148 to right-hand circular polarized light. In another example, the second mirror 124 may convert right-hand circular polarized light of the second light beam 148 to left-hand circular polarized light.

In embodiments, the method 500 includes a 530 step of transmitting the first light beam 147 back through the first waveplate 145 and through a polarization selection reflection surface 144, wherein the light from the first light beam 147 transmitting though the polarized selection reflection surface 144 is configured as (p)-polarized light. Therefore, the sequential transmitting and retransmitting of the first light beam 147 through the first waveplate 145 (e.g., a quarter-waveplate) and reflection off of the first mirror 120 converts the first light beam 147 to linear polarized light, albeit a linear polarized light having an opposite state as compared to the initial polarization state as the first light beam 147 formed from the initial split by the polarizing beam splitter 116.

In embodiments, the method 500 includes a step 540 transmitting the second light beam 148 back through the second waveplate 146 and reflecting the second light beam 148 off of the polarization selection reflection surface 144, wherein the light from the second light beam 148 reflected off of the polarization selection reflection surface 144 is configured as (s)-polarized light. Therefore, the sequential transmitting and retransmitting of the second light beam 148 through the second waveplate 146 (e.g., a quarter-waveplate) and reflection off of the second mirror 124 converts the second light beam 148 to linear polarized light, albeit a linear polarized light having an opposite state as compared to the initial polarization state as the second light beam 148 formed by the original split by the polarizing beam splitter 116.

In embodiments, the method 500 includes a step 550 of directing the first light beam and second light beam to a corrector lens, wherein the first light beam and the second light beam are combined to form a user image (e.g., an image that is observed by a user). For example, the (p)-polarized light 150 may be reflected from the first mirror 120 through the one or more polarization selective reflective surfaces 144, and through the corrector lens. At the same time, the (s)-polarized light 152 may be reflected from the second mirror 120 to the one or more polarization selective reflective surfaces 144, wherein the one or more polarization selective reflective surfaces 144 reflects the (s)-polarized light 152, directing the (s)-polarized light 152 through the corrector lens 208. Because the light paths of the (p)-polarized light 150 and (s)-polarized light 152 are substantially equal (e.g., the length of the light paths from the initial splitting of the light by the polarizing beam splitter 116 to the end face 140), the light from the (p)-polarized light 150 and (s)-polarized light 152 form a readily observable user image. For example, the substantially equal light paths may be within 10 mm of each other. In another example, the substantially equal light paths may be within 1 mm of each other. In another example, the substantially equal light paths may be within 0.1 mm of each other. In another example, the substantially equal light paths may be within 0.01 mm of each other. In another example, the substantially equal light paths may be within 0.001 mm of each other. As the (p)-polarized light and the (s)-polarized light reaches the end face 140, light beams (e.g., light paths) from the (p)-polarized light and the (s)-polarized light are parallel and/or collimated. For example, as the (p)-polarized light and the (s)-polarized light reaches the end face 140, light beams (e.g., light paths) from the (p)-polarized light and the (s)-polarized light may be collinear.

It should be understood that one or more components of the collimating optics 104 or one or more light paths for (e.g., (s)-polarization and (p)-polarization light paths) within the collimating optics 104 may be altered or otherwise modified. For example, the polarizing beam splitter 116 may be rotated (e.g., rotated -90°) from the orientation shown in FIG. 1) and the first waveplate 145 and first mirror 120 moved to the opposite side of the polarizing beam splitter. With this arrangement, the image light 112 will again be split and converted into (s)-polarized and (p)-polarized light paths, however, the light will leave the collimating optics 104 via what was originally the first waveplate face 132. Any arrangement of components or arrangements of coatings of components (e.g., the one or more polarization selective reflective surfaces 144) is possible.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. An optical system comprising:
    collimating optics, comprising:
        a polarization beam splitter comprising one or more polarization selection reflection surfaces configured to split image light from a light source into a first light beam and a second light beam;
        a field lens disposed on the polarization beam splitter configured to receive the image light from the light source;
        a first waveplate configured to receive the first light beam;
        a first mirror configured to receive the first light beam from the first waveplate and reflect the first light beam back through the first waveplate, wherein the first light beam transmits through or reflects from one of the one or more polarization selection reflection surfaces, wherein the first light beam that transmits through or reflects from the one of the one or more polarization selection reflection surfaces is configured as (s)-polarized light;
        a second waveplate configured to receive the second light beam;
        a second mirror configured to receive the second light beam from the second waveplate and reflect the second light beam back through the second waveplate, wherein the second light beam transmits through or reflects from the one of the one or more polarization selection reflection surfaces, wherein the second light beam that transmits through or reflects from the one or more polarization selection reflection surfaces is configured as (p)-polarized light; and
        a corrector lens configured to receive the first light beam reflected from the first mirror and the second light beam reflected from the second mirror, wherein a length of a light path of the first light beam and a length of a light path of the second light beam are substantially equal, wherein the first light beam and the second light beam are configured to combine to form a user image.

2. The optical system of claim 1, wherein the light path of the first light beam and the light path of the second light beam are parallel when exiting the collimating optics.

3. The optical system of claim 1, wherein the corrector lens, the field lens, the first mirror, the second mirror, and the polarization beam splitter are configured to fit into a package with a volume less than two cubic centimeters.

4. The optical system of claim 1, further comprising the light source.

5. The optical system of claim 1, wherein the light source includes at least one of a light emitting diode display, a micro light emitting diode display, a digital micromirror device, an organic light emitting diode display, an active-matrix liquid crystal display, or a liquid crystal on silicon display.

6. The optical system of claim 1, wherein the optical system is configured as a collimating system for display on a substrate waveguide.

7. The optical system of claim 6, wherein the substrate waveguide is be configured as a head up display.

8. The optical system of claim 4, wherein the light source comprises at least one of a source beam splitter, a mirror, or a prism.

9. The optical system of claim 1, wherein the optical system comprises a color-sensitive beam splitter.

10. The optical system of claim 1, wherein the field lens comprises a diffractive surface.

11. The optical system of claim 1, wherein at least one of the first waveplate or the second waveplate includes a quarter wave retarder film.

12. The optical system of claim 1, wherein the light path of the first light beam and the light path of the second light beam are within 1 mm of each other when exiting the collimating optics.

13. The optical system of claim 1, wherein the light path of the first light beam and the light path of the second light beam are collinear when exiting the collimating optics.

14. A method for providing light information to a user comprising:
    transmitting image light from a light source through a field lens disposed on a polarization beam splitter to the polarizing beam splitter;
    splitting the image light into a first light beam and a second light beam, wherein the first light beam and the second light beam are linearly polarized;
    transmitting the first light beam through a first waveplate, wherein the first light beam becomes circularly polarized;
    reflecting the first light beam off of a first mirror, wherein the first light beam is converted to a circularly polarized light having a different handedness than of a circular polarized light of the first light beam transmitted through the first waveplate;
    transmitting the second light beam through a second waveplate, wherein the second light beam becomes circularly polarized;

reflecting the second light beam off of a second mirror, wherein the second light beam is converted to a circularly polarized light having a different handedness than of the circular polarized light of the second light beam transmitted through the second waveplate;

transmitting the first light beam back through the first waveplate and through a polarization selection reflection surface, wherein light from the first light beam transmitting though the polarized selection reflection surface is configured as (p)-polarized light;

transmitting the second light beam back through the second waveplate and reflecting the second light beam off of the polarization selection reflection surface, wherein the light from the second light beam reflected off of the polarization selection reflection surface is configured as (s)-polarized light; and directing the first light beam and second light beam to a corrector lens, wherein the first light beam and the second light beam are combined to form a user image.

\* \* \* \* \*